2 Sheets—Sheet 1.
H. B. HEBERT.
Grain Drying, Scouring and Cleaning Apparatus.
No. 203,540. Patented May 14, 1878.
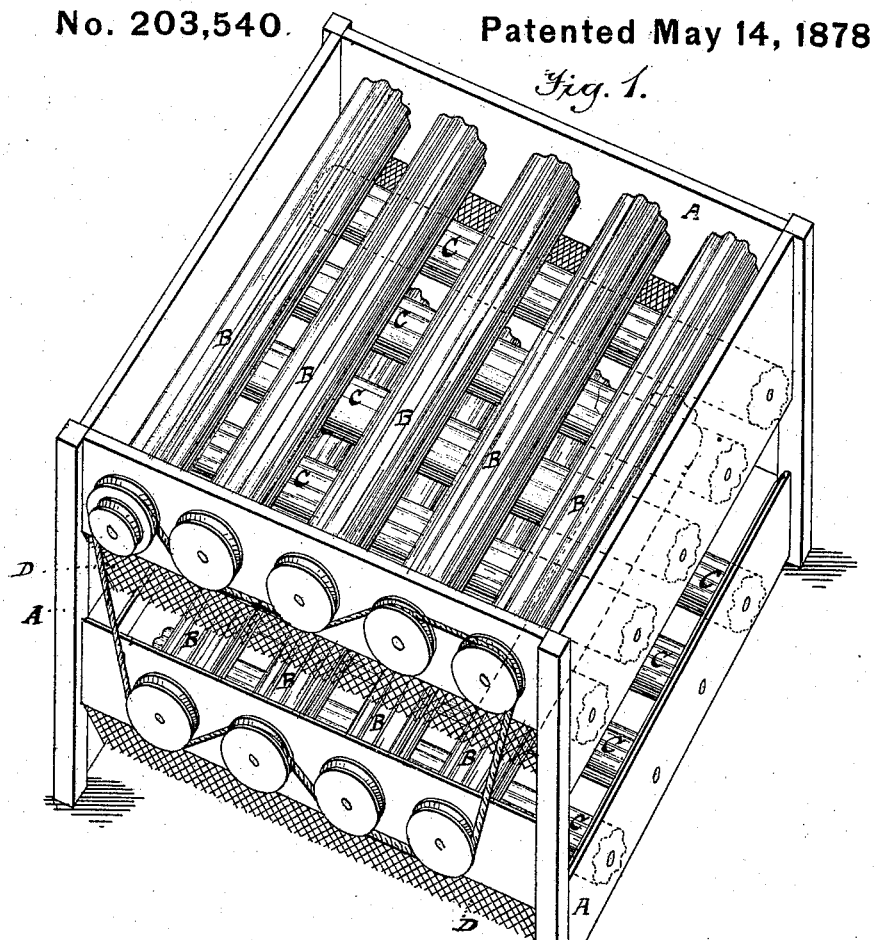
Fig. 1.
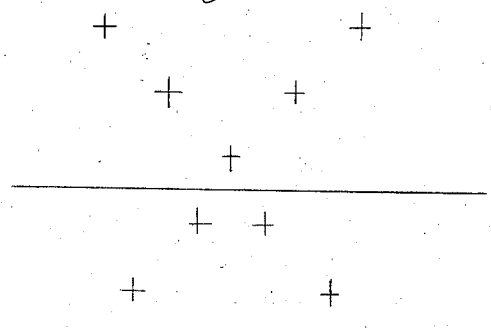
Diagram 1.
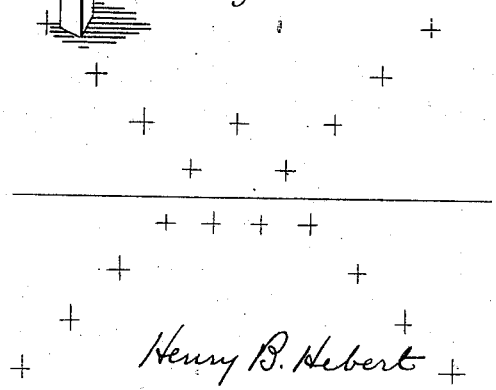
Diagram 2.
Attest,
John A. Deady
Fred P. Giblin
Henry B. Hebert
Inventor;

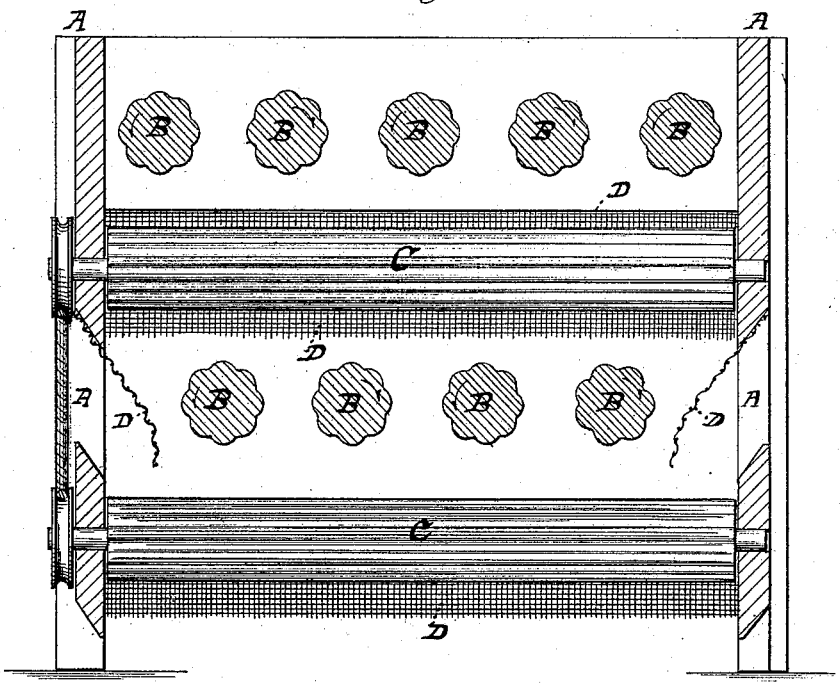

UNITED STATES PATENT OFFICE.

HENRY B. HEBERT, OF BROOKLYN, NEW YORK.

IMPROVEMENT IN GRAIN DRYING, SCOURING, AND CLEANING APPARATUS.

Specification forming part of Letters Patent No. 203,540, dated May 14, 1878; application filed March 6, 1878.

*To all whom it may concern:*

Be it known that I, HENRY B. HEBERT, of the city of Brooklyn, and county of Kings, and State of New York, have invented a new and useful Improvement in Mechanism for Drying, Scouring, Airing, Cooling, and Cleaning Grain, which improvement is fully set forth in the following specification and accompanying drawings, in which—

Figure 1 is a perspective view of a machine illustrating my invention, and Fig. 2 is a sectional view of the same.

The object of my invention is to dry, air, cool, and clean grain, seeds, &c.; and it consists in an apparatus composed of several series of rotary, fluted, or ribbed cylinders or rollers, one series over another, and arranged with the axes of those of each series crossing the axes of those of the series next above or below, the said rollers being mounted to rotate in a suitable frame, with suitable guards and conductors, as hereinafter particularly described, whereby the kernels of grain, seed, &c., while passing down, over, and among the revolving cylinders, are agitated and made to collide with each other and with the rollers, thereby scouring and cleaning them.

In the drawings, A A is a frame, constructed to support in suitable bearings several series of rotary, fluted, or ribbed cylinders or rollers, B C, each series being designated by the said letters respectively. The rollers of the several series are represented in the drawings as parallel and in the same plane with each other, and at right angles with those of the adjacent series. The angle at which the roller of the different series cross those of the adjacent series may, however, be varied at pleasure, and it is not essential that those of the same series should be in precisely the same horizontal plane, or that they should be exactly parallel with each other.

The rollers may be made of any suitable material; but I prefer to make them of metal, and hollow, thereby affording the opportunity of heating the same by steam introduced at the axes, or of forcing air into them, and from which it may escape through perforations, thereby blowing away the dust from the grain.

Any number of these series of rollers may be employed that may be desired.

A rotary motion may be given to the rollers by means of pulleys fixed on the ends of their shafts and belts passing over the same, so as to revolve them either all in the same direction or the alternates in opposite directions, as may be deemed most advisable. They may all be run at the same speed, or, having different-sized pulleys, they may be run at varying speeds.

If preferred, gear-wheels may be used in place of pulleys and belts. The latter, however, are preferable, as thereby the rollers may be more readily adjusted to different distances from each other.

The rollers may be inclosed; and it is desirable to have arranged on each side of the frame guide-boards or wire or other screens, as shown in the drawings, to conduct the grain toward the central portions of the rollers.

The particular form of the frame and the exact arrangement shown of the rollers are not essential. A frame of any suitable form and construction may be employed, and the rollers of each series may be arranged at any desired angle with those of the adjacent series.

The operation of the apparatus is as follows: The rollers being put in motion on their axes at a tolerably high rate of speed, the grain to be cleaned is conveyed to the machine in a suitable conductor and discharged upon the upper series near the center, whence it will pass down, over, and among the rollers, being in its progress dashed about by the ribs on the rollers, and the kernels made to collide with one another, whereby all dust and impurities will be scoured off. The dust as it is removed from the grain may be blown out of the machine by a current of air, either forced through and across it or into the rollers and through perforations in their shells.

What I claim as my invention, and desire to secure by Letters Patent, is—

A grain-cleaner composed of several series of rollers, arranged one over another, with the axes of those of each series crossing the axes of those of the next adjacent series, constructed and combined to operate as and for the purpose described.

HENRY B. HEBERT.

Witnesses:
 FREDK. GIBLIN,
 JOHN A. DEADY.